Sept. 25, 1956
E. A. ZEMROWSKI
2,764,187
ROUND TENON-CUTTING TOOL
Filed Aug. 26, 1954
2 Sheets-Sheet 1
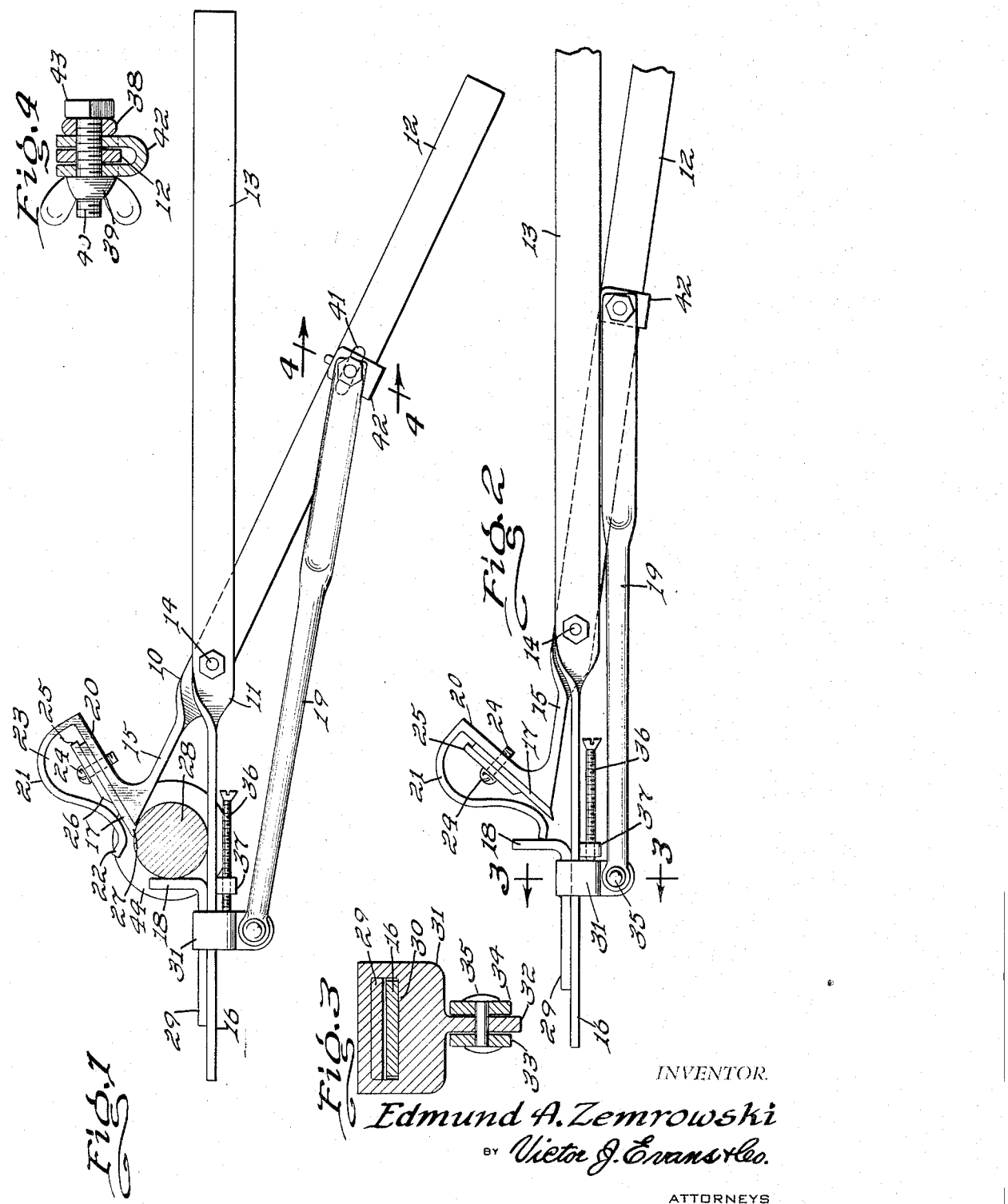
INVENTOR.
Edmund A. Zemrowski
BY Victor J. Evans & Co.
ATTORNEYS Sept. 25, 1956  E. A. ZEMROWSKI  2,764,187
ROUND TENON-CUTTING TOOL Filed Aug. 26, 1954  2 Sheets-Sheet 2

INVENTOR.
Edmund A. Zemrowski
BY Victor J. Evans & Co.
ATTORNEYS

United States Patent Office 2,764,187
Patented Sept. 25, 1956

2,764,187

ROUND TENON-CUTTING TOOL

Edmund A. Zemrowski, Michigan City, Ind.

Application August 26, 1954, Serial No. 452,419

3 Claims. (Cl. 142—56)

This invention relates to cutting tools particularly adapted for cutting pins on ends of bars, legs, or other material with the work held in a wood-turning lathe and with a cutting element in the form of a plane and positioned in a jaw of one of a pair of pivotally connected levers and with the other jaw provided with means for adjustably holding the work or pin in relation to the cutting blade of the plane.

The purpose of this invention is to provide a cutting tool adapted to be held by hand for turning pins on work in a wood-turning lathe.

In different types of articles of manufacture and particularly furniture, it is difficult to hold a cutting tool on a rest in a wood-turning lathe to accurately cut a pin such as a tenon pin particularly at the end of a bar, leg or other connecting member and with the cutting tool held by hand it is difficult to cut the tenon pin accurately to a desired dimension. Pins for this use are inserted in holes in adjoining members and, consequently, more efficient construction is obtained if the pins are turned exactly to size. With this thought in mind, this invention contemplates a tenon pin cutting tool that engages both sides of the pin thereby making it possible to accurately hold a cutting knife as the pin is turned.

The object of this invention is, therefore, to provide a tenon-cutting tool that is adapted to be held by hand and that is adapted to cut tenons in a wood-turning lathe.

Another object of the invention is to provide a tenon-cutting tool in the form of a pair of pliers having pivotally connected levers with a plane-cutting blade on the end of one lever and a stop for the work on the end of the other lever and which the stop for the work is adjustably mounted on the lever.

A further object of the invention is to provide a tool for cutting tenons at ends of work in a wood-turning lathe in which the tool is held by hand and in which the tool is of a simple and economical construction.

With these and other objects and advantages in view, the invention embodies a pair of levers pivotally connected and having handles extended from one side of the connection and jaws extended from the opposite side with a blade, such as the knife or blade of a plane, installed in one of the jaws and with an L-shaped stop slidably mounted on the other jaw and pivotally connected by a rod to a clamp on the handle of the former jaw.

Other features and advantages of the invention will appear from the following description taken in connection with the drawings, wherein:

Figure 1 is a side elevational view illustrating the improved tenon-cutting tool showing the tool with the parts in operative positions.

Figure 2 is a view similar to that shown in Figure 1 showing the parts in folded or collapsed positions.

Figure 3 is a cross section through the mounting of the adjustable stop on one of the jaws of the tool, said section being taken on line 3—3 of Figure 2 and the parts being shown on an enlarged scale.

Figure 4 is a cross section through the clamp for attaching a movable stop to the handle on the jaw on which the plane elements are positioned, said section being taken on line 4—4 of Figure 1 and the parts being shown on an enlarged scale.

Figure 5:
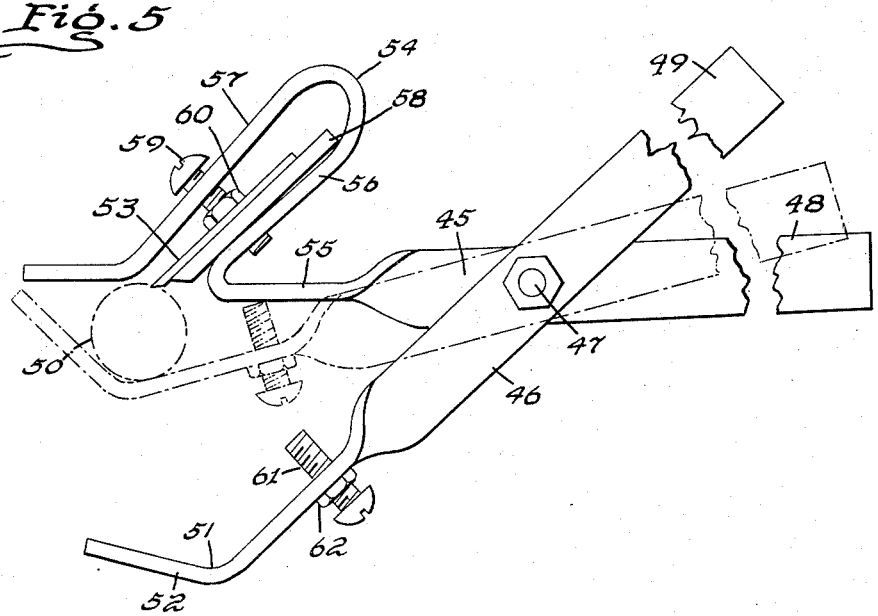
Figure 5 is a side elevational view similar to that shown in Figure 1 illustrating a modification wherein the work-holding jaw is formed to provide a socket for retaining the work as the planing knife cuts the surface thereof.

Referring now to the drawings wherein like reference characters denote corresponding parts, the improved tenon-cutting tool of this invention includes a pair of levers 10 and 11 having handles 12 and 13 pivotally connected with a pin 14 and having parts 15 and 16, similar to jaws, with a cutting blade 17, similar to the blade of a plane, mounted on the jaw 15 and an L-shaped clip 18 providing a stop adjustably mounted on the jaw 16 and connected to the handle 12 of the jaw 15 with a rod 19.

The jaw 15 of the lever 10 is provided with a section 20, similar to the frame of a plane, and the extended end of the section 20 is provided with an arcuate arm 21 having a shoe 22 on the extended end and providing an open area 23 in which the cutting blade 17 is positioned, as shown in Figure 1. The cutting blade 17, which is similar to the blade or knife of a plane, is adjustably mounted on the section 20 with a screw 24 and a spacing plate 25 positioned between the head of the screw and the blade 17 provides clamping means whereby the cutting blade is secured in adjusted positions. The plate 25 is provided with a beveled edge 26 and the blade 17 is provided with a beveled cutting edge 27, the flat surface of the edge 27 being adapted to be positioned upon work, such as a tenon 28. By this means the position of the cutting blade is readily adjusted to compensate for tenons of different sizes and the position of the stop 18 is adapted to be adjusted to hold the tool in position whereby the blade 17 is in cutting relation with a surface of the tenon.

The clip or stop 18 is provided with a base 29 and, as illustrated in Figure 3, the base 29 and flat section of the jaw 16 extend through a socket 30 in a collar 31, the base 29 being secured, such as by welding, to the collar and the collar being slidably mounted on the jaw 16.

The collar 31 is provided with a depending tongue 32 that is secured between sections 33 and 34 of the bifurcated end of the rod 19, with a rivet 35.

The collar 31 is retained in adjusted positions on the jaw 16 with a set screw 36 which is threaded in a lug 37 on the under surface of the jaw.

The extended end 38 of the rod 19 is secured by a bolt 40 having a wing nut 39 thereon to the lever 12, the bolt being positioned in a slot 41 in the lever and extending through a U-shaped clamp 42 positioned over the lever 12. A head 43 of the bolt 40 is positioned against the outer surface of the rod 19.

With the parts assembled as shown and described, a round pin, such as the tenon 28, on the end of a leg, bar or other piece of material, as indicated by the numeral 44, is positioned in a lathe and with the tenon in position jaw 16 is placed against the lower surface whereby with the cutting blade 17 pressed against the upper surface and with the handles 12 and 13 gripped by hand the cutting blade is readily retained in cutting relation with the tenon. By this means the tenon may readily be turned to a desired size.

Figure 6:
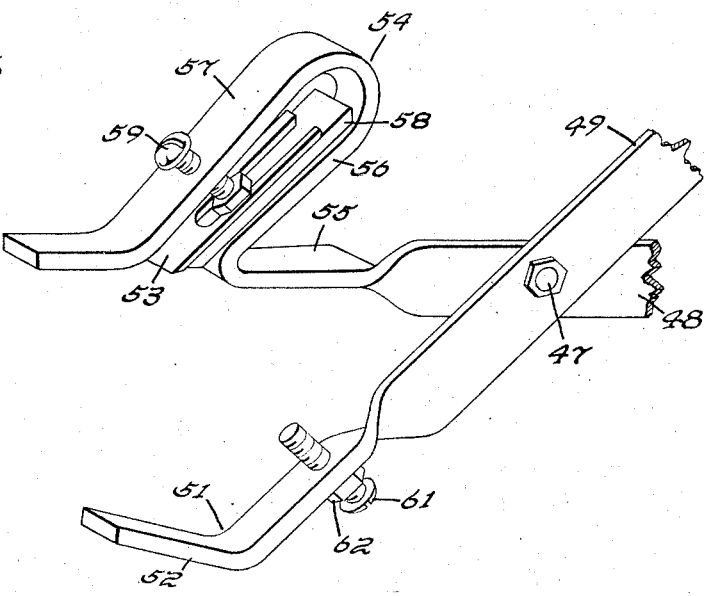
Figure 6 is a side elevational view, similar to that shown in Figure 5, the parts being shown in perspective to illustrate the arrangement and construction thereof.

In the design illustrated in Figures 5 and 6, levers 45 and 46 pivotally connected by a bolt 47 and having handles 48 and 49 extended therefrom are provided with cutting and retaining elements wherein a tenon, as indicated by the numeral 50, positioned in a recess 51 in a jaw 52 of the lever 49 is adapted to be turned by a knife blade 53 in a loop 54 of a jaw 55 of the lever 48. The loop 54 is provided with a base 56 and a front section 57, and the cutting blade 53 is mounted on a base plate 58 and retained in cutting relation with work held by the other jaw with a set screw 59 and a lock nut 60.

With the parts formed in this manner, a set screw 61 having a lock nut 62 thereon and threaded in the jaw 52 is set whereby the closing movements of the jaws is halted when the tenon reaches the size desired.

With a tenon-cutting tool as shown and described, the set screw 36 of the design shown in Figure 1 or the set screw 61 of the design shown in Figures 5 and 6 is set whereby the cutting blade is halted a predetermined distance from the jaw 16 or 52 thereby making it possible to cut a tenon accurately to a predetermined size without making the tenon undersized. Providing means for setting cutting tools for this use makes it possible to cut a plurality of tenons of the same size without resetting a tool. The tool is, therefore, particularly adapted for quantity production where it is essential that a plurality of tenons be accurately cut to a predetermined size.

It will be understood that other modifications, within the scope of the appended claims, may be made in the design and arrangement of the parts without departing from the spirit of the invention.

What is claimed is:

1. A tenon-cutting tool comprising a pair of pivotally connected jaws having handles extended from one side of the pivotal connection and in which the jaws extend from the opposite side, a cutting blade adjustably mounted in one of the jaws, and a work-holding stop adjustably mounted on the other jaw forwardly of said cutting blade, and a rod operatively connecting the work-holding stop to the handle of the jaw upon which the cutting blade is positioned.

2. In a tenon-cutting tool, the combination which comprises a pair of jaws, means for pivotally connecting the jaws, handles integral with the jaws and extended from the side of the pivotal connection opposite to that from which the jaws extend, a plane element having an adjustable cutting blade therein included in one of said jaws, a work-holding stop slidably mounted on the other of said jaws, a rod operatively connecting the work-holding stop to the handle of the jaw having the cutting blade and adjustable means for limiting closing movements of the jaws.

3. In a tenon-cutting tool, the combination which comprises a pair of jaws having handles extended therefrom, a bolt pivotally connecting the jaws and positioned between the jaws and handles, one of said jaws being straight and the other jaw having an angularly disposed section with an arcuate extension extended from the extended end formed therein, a cutting blade adjustably mounted on said angularly disposed section of the jaw and positioned to coact with the other jaw for cutting work positioned between the jaws, an L-shaped stop slidably mounted on the straight jaw, a rod pivotally connected to said stop at one end and positioned with the opposite end adjustably connected to the handle of the jaw upon which the cutting blade is positioned, and a set screw positioned on said straight jaw coacting with said stop for limiting closing movements of the jaws.

References Cited in the file of this patent

UNITED STATES PATENTS

| 219,970 | Muller | Sept. 23, 1879 |
| 284,944 | Burge | Sept. 11, 1883 |
| 403,521 | Cutlan | May 21, 1889 |
| 619,159 | Fosby | Feb. 7, 1899 |